US012769340B2

(12) United States Patent
Pan

(10) Patent No.: US 12,769,340 B2
(45) Date of Patent: Oct. 20, 2026

(54) MASS FLOW CONTROLLER WITH DUAL-MODE PID CONTROL LOOP FOR ENHANCED SPEED, ACCURACY, AND STABILITY

(71) Applicant: Yang Pan, Singapore (SG)

(72) Inventor: Yang Pan, Singapore (SG)

(73) Assignee: Inspiring Atoms Pte Ltd, Singapore (SG)

( * ) Notice: Subject to any disclaimer, the term of this patent is extended or adjusted under 35 U.S.C. 154(b) by 289 days.

(21) Appl. No.: 18/676,337

(22) Filed: May 28, 2024

(65) Prior Publication Data

US 2025/0370484 A1 Dec. 4, 2025

(51) Int. Cl.
*G05D 7/06* (2006.01)

(52) U.S. Cl.
CPC ......... *G05D 7/0623* (2013.01); *G05D 7/0635* (2013.01); *G05B 2219/37371* (2013.01); *G05B 2219/42033* (2013.01)

(58) Field of Classification Search
CPC ............... G05D 7/0623; G05D 7/0635; G05B 2219/37371; G05B 2219/42033
USPC .......................................................... 700/282
See application file for complete search history.

(56) References Cited

U.S. PATENT DOCUMENTS 3,335,748 A 8/1967 Klemm et al.
3,910,113 A 10/1975 Brown
4,718,443 A 1/1988 Adney et al.
5,003,810 A 4/1991 Jepson et al.
5,190,068 A 3/1993 Philbin
5,624,409 A 4/1997 Seale
5,988,211 A 11/1999 Cornell
6,178,995 B1 1/2001 Ohmi et al.
6,314,991 B1 11/2001 Gill
6,631,334 B2 10/2003 Grosshart
6,868,862 B2 3/2005 Shajii et al.
7,073,392 B2 * 7/2006 Lull .......................... G01F 1/86
702/50
7,376,520 B2 5/2008 Wong et al.
7,431,045 B2 10/2008 Mudd et al.
7,706,925 B2 4/2010 Ding et al.
7,757,554 B2 7/2010 Ding et al.
7,822,570 B2 10/2010 Shareef et al.
7,905,139 B2 3/2011 Lull
8,646,307 B2 2/2014 Yasuda et al.
9,027,585 B2 5/2015 Smirnov
9,188,989 B1 11/2015 Mudd et al.
9,234,775 B2 1/2016 Larson et al.
9,304,030 B2 4/2016 Tanaka et al.
(Continued)

FOREIGN PATENT DOCUMENTS

TW 201417990 A 4/2014

*Primary Examiner* — Md Azad

(57) ABSTRACT

This invention disclosure presents a mass flow controller (MFC) with a dual-mode proportional-integral-derivative (PID) control loop. In training mode, the PID loop determines solenoid coil current setpoints for various operating states stipulated by a process recipe, storing them for later retrieval. During the execution of a semiconductor manufacturing process, the stored setpoints enable rapid flow delivery without continuous PID control. Real-time flow rate monitoring and Statistical Process Control (SPC) ensure stability, triggering retraining if necessary, enhancing MFC speed, accuracy, and reliability.

18 Claims, 4 Drawing Sheets

(56) References Cited

U.S. PATENT DOCUMENTS

| | | | | |
|---|---|---|---|---|
| 9,557,744 | B2 | 1/2017 | Ding | |
| 9,766,635 | B2 | 9/2017 | Smirnov et al. | |
| 9,797,765 | B2 | 10/2017 | Nagai | |
| 9,952,078 | B2 | 4/2018 | Ding | |
| 9,983,595 | B2 | 5/2018 | Monkowski et al. | |
| 9,989,383 | B2 * | 6/2018 | Li | G01D 5/20 |
| 10,054,959 | B2 | 8/2018 | Somani | |
| 10,386,861 | B2 | 8/2019 | Hirata et al. | |
| 10,591,934 | B2 | 3/2020 | Gopalakrishnan et al. | |
| 10,606,285 | B2 | 3/2020 | Ding | |
| 10,782,165 | B2 | 9/2020 | Mudd et al. | |
| 10,801,867 | B2 | 10/2020 | Ding | |
| 11,662,237 | B2 | 5/2023 | Shareef et al. | |
| 2008/0167748 | A1 * | 7/2008 | Ding | G05D 16/2046 700/121 |
| 2012/0101638 | A1 * | 4/2012 | Lin | G05B 11/42 700/282 |
| 2012/0132291 | A1 * | 5/2012 | Monkowski | G05D 7/0635 137/551 |
| 2012/0180876 | A1 | 7/2012 | Hayashi et al. | |
| 2012/0186655 | A1 * | 7/2012 | Smirnov | F16K 37/0091 137/486 |
| 2012/0197446 | A1 * | 8/2012 | Glaudel | G05D 7/0635 700/282 |
| 2014/0069527 | A1 | 3/2014 | Mudd et al. | |
| 2015/0027558 | A1 | 1/2015 | Kehoe et al. | |
| 2017/0152963 | A1 * | 6/2017 | Phillips | H01F 7/1844 |
| 2023/0366715 | A1 * | 11/2023 | Marath Sankarathodi | G01F 15/002 |
| 2025/0053182 | A1 * | 2/2025 | Ding | G01F 25/15 |

* cited by examiner

MASS FLOW CONTROLLER WITH DUAL-MODE PID CONTROL LOOP FOR ENHANCED SPEED, ACCURACY, AND STABILITY

FIELD OF THE INVENTION

The present invention relates to mass flow controllers (MFCs) used in various industrial and manufacturing processes. More specifically, the invention pertains to a dual-mode PID control loop system that optimizes the performance of MFCs by improving speed and stability through the implementation of a training mode for setting solenoid coil current values and an inference mode for real-time flow rate monitoring and stability control.

BACKGROUND OF THE INVENTION

Mass flow controllers (MFCs) are essential components in numerous industrial applications where precise control of fluid flow is required. These applications include, but are not limited to, semiconductor manufacturing processes such as atomic layer deposition (ALD) and atomic layer etching (ALE), where rapid delivery of gases is crucial for process performance and product quality. Traditional MFCs rely on continuous operation of proportional-integral-derivative (PID) control loops to regulate fluid flow, which can be time-consuming and less efficient, particularly when rapid adjustments are necessary.

One of the challenges with existing MFCs is the latency in achieving desired flow rates due to the continuous adjustment required by the PID control loop. This latency can negatively impact the throughput and efficiency of processes that demand quick and precise flow rate changes.

Additionally, continuous operation of the PID control loop can lead to increased wear and tear on system components, further reducing the reliability and lifespan of the MFCs. Another significant issue is the lack of robust mechanisms for monitoring and maintaining the stability of MFC operations over time. Variations in flow rates and potential drift in system performance can result in deviations from the desired process conditions, leading to suboptimal product quality and potential process failures.

It is in this context, the issues are addressed by various embodiments of the present invention, which improve significantly speed, accuracy and stability of MFC operations.

SUMMARY

The present invention relates to an MFC designed to optimize fluid flow regulation in various process systems. In some embodiments, a training mode is employed to determine the setpoints of the solenoid coil current while a dual-mode PID control loop is in active mode During this training mode, the MFC controller activates the PID control loop to establish accurate solenoid coil current values for each operating state associated with a specific fluid flow rate. These setpoints are then stored in a storage unit.

In some embodiments, when executing a process recipe, the stored setpoints are retrieved, allowing the MFC to achieve the desired flow rates without the need for continuous adjustment by PID control loop. This significantly enhances the speed of the MFC, making it highly suitable for applications requiring rapid and precise fluid flow adjustments, such as atomic layer deposition (ALD) and atomic layer etching (ALE). The ability to quickly reach the setpoints without the PID control loop improves the efficiency and throughput of the process system.

Another crucial feature of the invention is the ability to measure flow rates in inference mode while the process recipe is executed. In some embodiments, during this mode, the flow sensor monitors the flow rate, and the data is stored and analyzed using Statistical Process Control (SPC) methods to ensure the stability of the MFC's operation. This data can be used to establish trend charts and monitor the stability of the flow rates. If an instability or out-of-control condition is detected, a retraining event maybe triggered to recalibrate the setpoints, ensuring ongoing accuracy and stability. In some implementations, the controller may also decide that the MFC requires maintenance if the retraining does not correct the instability.

The invention further includes features where, in some embodiments, the MFC controller is connected to a system controller of a process system, which receives a process recipe and identifies a plurality of operating states of the MFC. Each operating state is associated with a specific flow rate for a fluid, and the dual-mode PID control loop ensures precise control and adjustment of the flow rates.

This dual-mode operation, combining training and inference modes, enhances the performance and efficiency of the MFC. It provides both high-speed operation and robust process stability monitoring, which are critical for maintaining the accuracy and consistency required in advanced manufacturing processes. The invention offers a substantial improvement over traditional MFCs by reducing the time needed to achieve desired flow rates and by providing continuous monitoring and adjustment capabilities to maintain optimal performance.

BRIEF DESCRIPTION OF THE DRAWINGS

The described embodiments are best comprehended by referring to the ensuing description in tandem with the accompanying drawings.

DETAILED DESCRIPTION

In the subsequent detailed elucidation of the current invention, certain specific embodiments are delineated to ensure a comprehensive understanding of the invention. Nonetheless, it will be evident to those proficient in the field that the invention can be executed without these particulars, or by employing alternative elements or methodologies. In some cases, well-acknowledged processes, procedures, and components have been intentionally left undetailed to avoid obscuring facets of the invention unnecessarily.

Figure 1:
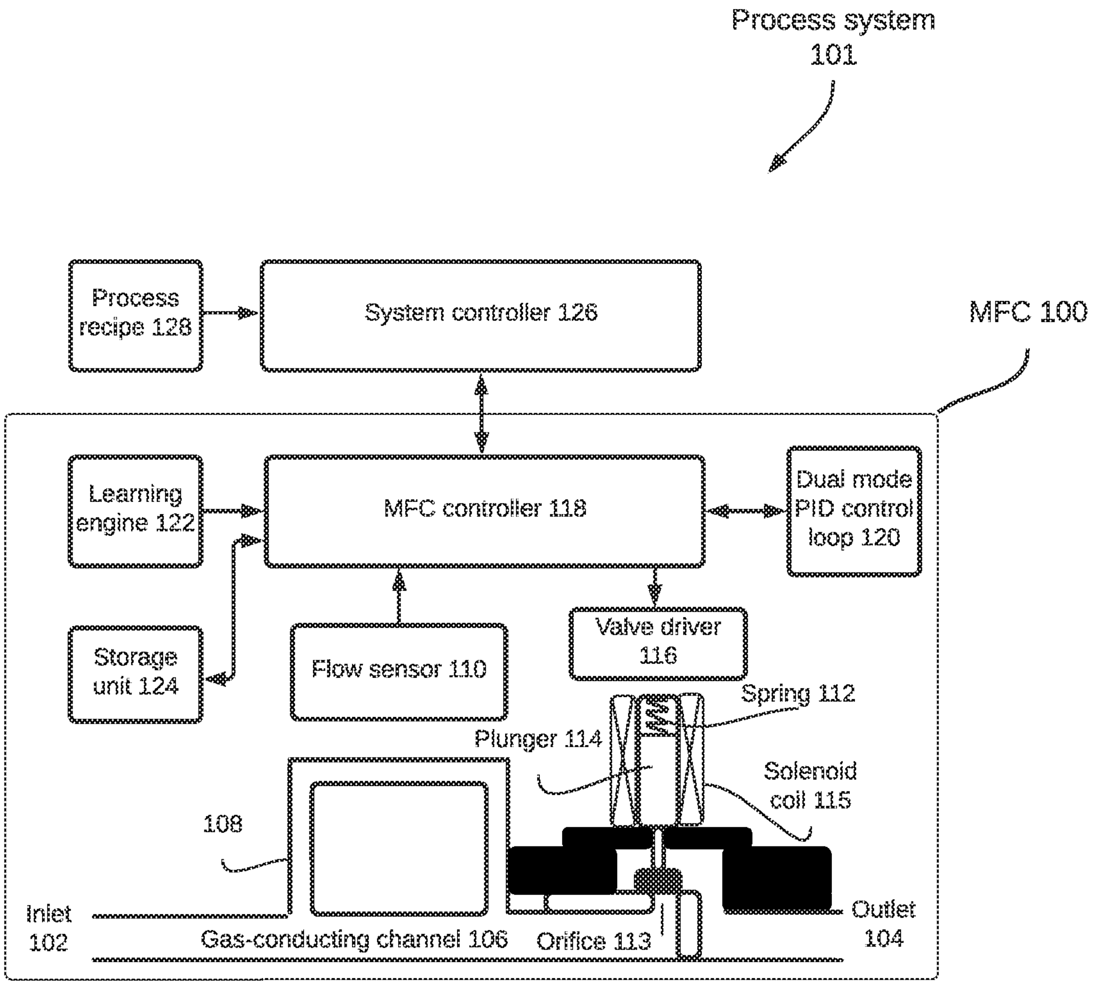
FIG. 1: Illustrates a schematic representation of an exemplary MFC, incorporating a dual-mode PID control loop and a learning engine.

Referring to FIG. 1, a schematic representation of an exemplary MFC 100 is presented. The MFC 100 is a part of a process system 101. For example, the process system 101 may be an etching or a deposition apparatus. Details of the process system 101 are not depicted in FIG. 1. The MFC 100 comprises an inlet 102 and an outlet 104, both associated with a gas-conducting channel 106. The present inventive concept is applicable to any type of fluid; gas is used as an example throughout this disclosure. Hence, the gas-conducting channel 106 is an example of a more general fluid-conducting channel.

Within the setup, a proportional valve (not depicted in the figure) functions to divert a fraction of the gas towards channel 108. The diverted gas flow rate is ascertained by the flow sensor 110. Typically, a thermal flow sensor is employed to discern the temperature differential at two designated positions along a laminar flow trajectory. Consequently, the flow rate of the diverted gas serves as a proxy for the flow rate within the gas-conducting channel 106.

Further to the structure of MFC 100, it incorporates a solenoid valve. This valve encompasses a spring 112, which retains the plunger 114. The position of plunger 114 dictates the gas conductance across orifices 113. When the plunger 114 interfaces with orifice 113, gas conduction ceases. Moreover, the solenoid valve associated with plunger 114 is supplemented with a solenoid coil 115. When current flows through coil 115, it induces a magnetic pull. Given that the plunger 114 is traditionally crafted from ferromagnetic materials, the combined mechanical pressure exerted by spring 112 and the magnetic attraction produced by coil 115 act upon the plunger 114. The equilibrium between these forces ultimately prescribes the position of plunger 114.

Flow sensor 110 conveys its readings to an MFC controller 118. This controller juxtaposes the received data against a pre-established benchmark value residing within a storage unit 124. Should a discrepancy arise between the sensor's reading and the benchmarked value, the controller 118 dispatches a directive to a valve driver 116. In turn, the valve driver 116 formulates a revised current for the solenoid coil 115, prompting a positional shift in plunger 114. Post this repositioning, flow sensor 110 re-evaluates the flow rate of the redirected gas. This calibration loop continues until the observed flow rate aligns with the benchmarked rate. To expedite this process, the MFC controller 118 employs a PID control loop. Typically, this calibration phase spans several dozen to several hundred milliseconds, a duration that is suboptimal for ALD and ALE.

A characteristic feature of the present invention is the use of a dual-mode PID control loop 120 to enable MFC 100 to operate in two distinctly different operating modes: training and inference.

The MFC controller 118 is connected to a system controller 126. The system controller 126 receives a process recipe 128 and converts the recipe into a time series of instructions for each of its subsystems, where MFCs are important parts for controlling the delivery of gases or precursors accurately to a process chamber.

Upon receiving the process recipe, the system controller 126 analyzes it and identifies all operating states of the MFC 100. Each operating state is correlated to a distinct gas flow rate for a specific gas. Setpoints of the MFC 100 will need to be trained for each operating state. In all embodiments, solenoid coil current is chosen as the setpoint to deliver a required flow rate for the gas.

In the training mode, the dual-mode PID control loop is in active mode. A learning engine 122 is utilized to establish the relationship between the solenoid coil current and the flow rate for each operating state. The learning engine 122 can be implemented as software, hardware, firmware, or a combination thereof.

In the training mode, a test procedure, including a list of tests for the MFC 100, is carried out by either the MFC controller 118 or the system controller 126. A typical test includes running a gas stipulated by the process recipe through the MFC 100, determining, and recording in the storage unit 124 the solenoid coil current for the required flow rate of the operating state. Each operating state will require at least one test. The dual-mode PID control loop 120 is active in the training mode. The training mode is typically conducted before a substrate is processed. In production, the training for the MFC 100 can be done with various occurrences. In one implementation, the test procedure is carried out when a new process recipe is introduced. In another implementation, the test procedure may be carried out after a predetermined number of substrates have been processed. It should also be noted that several or many MFCs may be employed for one process system; the trainings can be executed concurrently for several or all MFCs.

In the inference mode, the MFC controller 118 receives its real-time operating state from the system controller 126 and retrieves stored solenoid coil current value from the storage unit 124. The valve driver 116 generates a current according to the retrieved value supervised by the MFC controller 118. The current, coursing through the solenoid coil 115, brings the plunger 114 into the predetermined position to deliver the required flow rate for the operating state.

Without activating the dual-mode PID control loop, the speed for the MFC 100 reaching the setpoint can be greatly improved to the millisecond range. This will dramatically improve the productivity of atomic layer processing like ALE and ALD.

The inference mode is associated with the processing of a substrate, typically in a production event. While the dual-mode PID control loop is in the inactive mode, the flow sensor 110 can be employed to continue to measure and record the flow rates in the storage unit 124. The measurement results can be grouped for each operating state. The MFC controller 118 or the system controller 126 can apply the data to establish a trend chart to monitor the stability of the MFC 100 operation. SPC rules can be applied to decide if retraining is needed. All such operations can be carried out in the background with no impact on the MFC operating speed.

Figure 2:
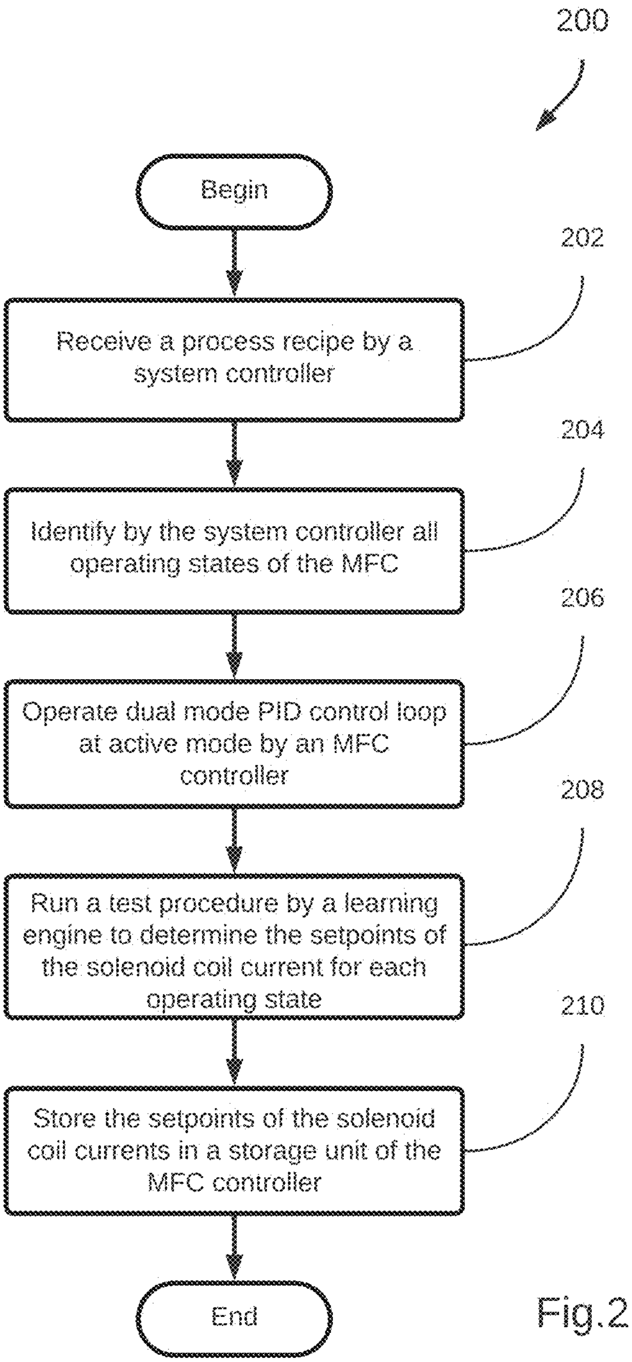
FIG. 2: Showcases a flowchart of an MFC operated in a training mode with the PID control loop in an active mode.

FIG. 2 showcases a flowchart of an exemplary training process, denoted as 200. Process 200 commences with step 202, wherein a process recipe is received by the system controller 126. The system controller 126 identifies all operating states of the MFC 100 stipulated by the recipe in step 204. Each operating state is associated with a distinct flow rate for a gas. The dual-mode PID control loop 120 is in active mode in step 206. The MFC controller 118 receives a measured flow rate from the flow sensor 110 and compares it with a stored benchmarked value. If there is a discrepancy, the MFC controller 118 will deliver an updated current to the solenoid coil 115 through the valve driver 116. The process is continuous until the measured value matches the benchmarked one. A PID control mechanism is employed to expedite the process as known in the art. In step 208, the MFC controller 118 runs a test procedure using the learning engine 122 to determine the setpoint of the solenoid coil current for each operating state. The setpoint of the solenoid coil current is measured after a steady state flow rate is achieved. In step 210, the setpoints of the solenoid coil current are stored in the storage unit 124.

Figure 3:
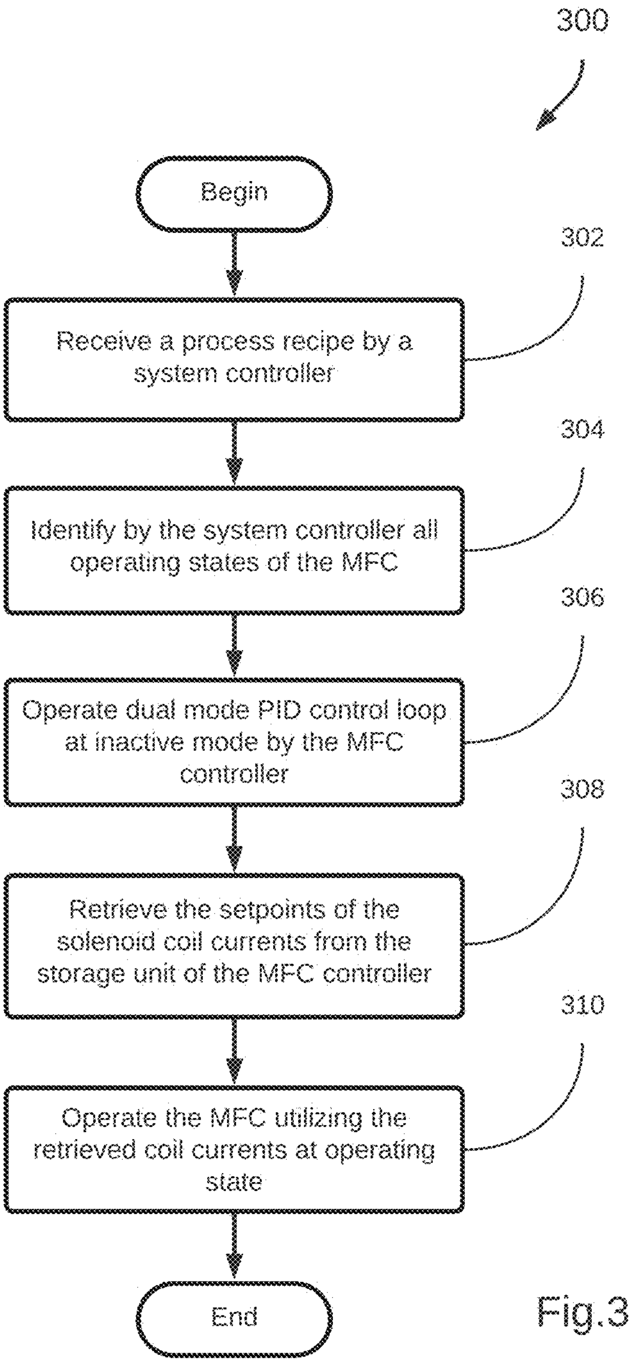
FIG. 3: Showcases a flowchart of an MFC operated in an inference mode with the PID control loop in an inactive mode.

FIG. 3 showcases a flowchart of an exemplary inference process 300. The process starts with step 302, wherein a process recipe is received by the system controller 126. The operating states for the MFC 100 are identified in step 304. The dual-mode PID control loop 120 is in an inactive mode in step 306. The setpoints of the solenoid coil currents are retrieved from the storage unit 124. The setpoints may be stored in a fast cache of the MFC controller 118. The process recipe is then executed by the system controller 128 step-by-step. At each operating state of the MFC 100, the MFC controller 118 fetches the setpoint value associated with the state and directs the valve driver 116 to deliver the required solenoid coil current without involving the PID control loop.

A distinct advantage of the present inventive concept is that the flow sensor 110, disengaged from the PID control loop, is used to measure the steady state flow rate corresponding to the setpoint. The measured flow rates at selected operating states or all the operating states can be employed to monitor the stability of the manufacturing process.

Figure 4:
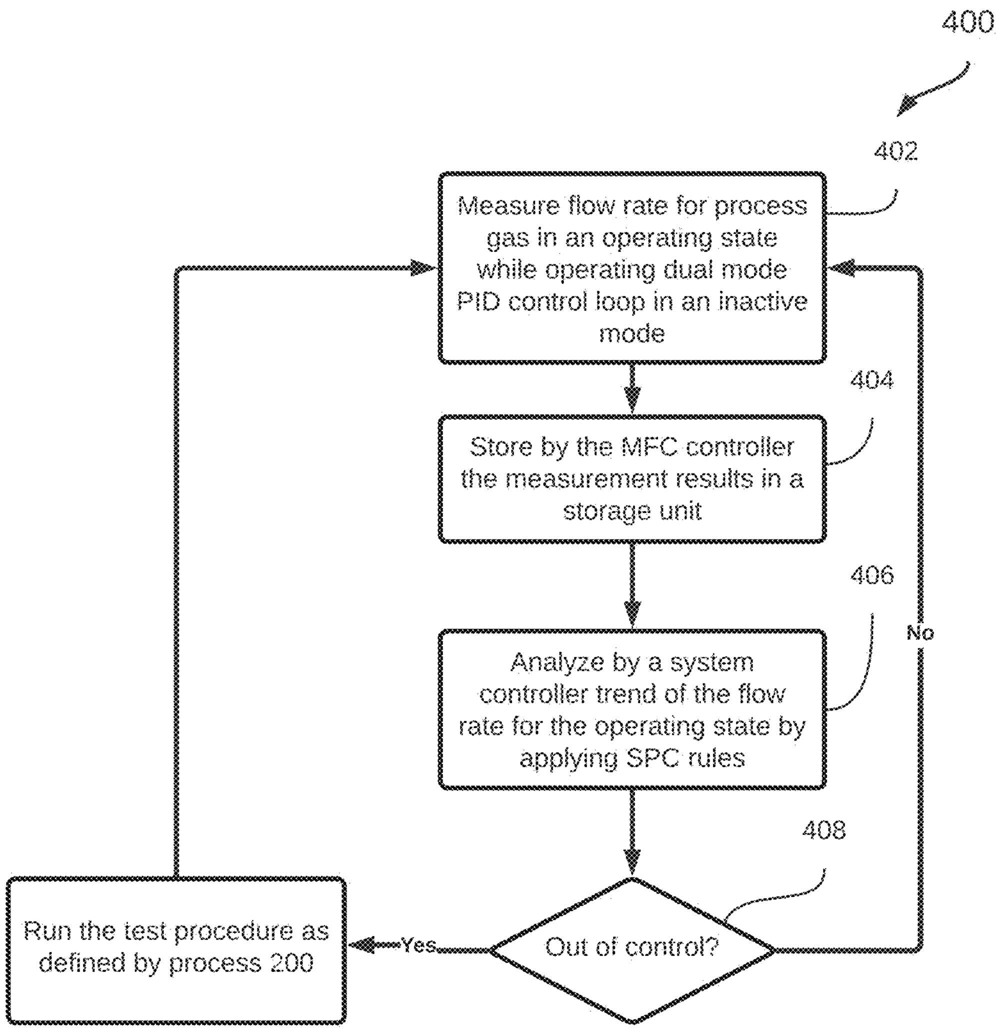
FIG. 4: Depicts a flowchart of a control process of an MFC applying SPC methodology.

Process 400 as shown in FIG. 4 starts with step 402, wherein the flow rate for a process gas in an operating state is measured while the associated process step is being executed. The dual-mode PID control loop 120 is in the inactive mode. The measurement results are stored in the storage unit 124 in step 404. In one implementation, the system controller 126 analyzes the trend of the measured flow rates for a specific operating state. SPC rules can be applied to evaluate the stability of the MFC 100 in step 408. If an out-of-control event is detected by the system controller 126, the controller decides that MFC 100 is required to be retrained by re-running process 200 to establish revised setpoints. In some instances, the system controller 126 may decide that the MFC 100 is malfunctioning and request a maintenance event. In some implementations, the MFC controller may perform the evaluation. In other implementations, the MFC controller 118 and the system controller 126 work together to conduct the evaluation.

The invention claimed is:

1. A mass flow controller (MFC), comprising:
- a fluid-conducting channel for conducting a flow of a fluid;
- an inlet structured to receive the fluid, wherein a proportional valve directs a portion of the fluid to a separate channel coupled to a flow sensor;
- an outlet structured to discharge the fluid via the fluid-conducting channel;
- a solenoid valve including a spring, a plunger, an orifice, and a solenoid coil, wherein a position of the plunger, influenced by a current applied to the solenoid coil, governs a flow rate of the fluid; and
- an MFC controller configured to regulate the flow rate of said fluid by running a dual-mode PID control loop either in an active mode or in an inactive mode, wherein in the active mode, solenoid coil current value related to a flow rate of a specific fluid is determined and stored in a storage unit, and wherein in the inactive mode, said current value is retrieved to bring the plunger to a position to deliver required flow rate.

2. The MFC of claim 1, wherein the MFC controller is connected to a system controller of a process system.

3. The MFC of claim 2, wherein the system controller is configured to receive a process recipe and identify a plurality of operating states of the MFC.

4. The MFC of claim 3, wherein each of the plurality of operating states is associated with a flow rate for a specific fluid.

5. The MFC of claim 1, wherein the MFC controller further includes a learning engine, wherein the learning engine conducts a test procedure.

6. The MFC of claim 5, wherein the learning procedure is conducted while the dual-mode PID control loop is in active mode.

7. The MFC of claim 1, wherein a valve driver generates a current based on the retrieved current value to bring the plunger to the position to deliver the designated flow rate for the specific fluid stipulated by the process recipe.

8. The MFC of claim 1, wherein the flow sensor measures flow rate for the specific fluid while the PID control loop is in the inactive mode.

9. The MFC of claim 8, wherein the measured flow rate is stored in a storage unit for establishing a trend chart as an input to apply SPC rules by the system controller.

10. The MFC of claim 1, wherein the dual-mode PID control loop further comprises the flow sensor, the solenoid valve, and the MFC controller, wherein the position of the plunger is adjusted based on an output of the flow sensor compared to a benchmark value provided by the MFC controller.

11. A method of controlling flow rate of a fluid by an MFC, comprising the steps of:
- receiving a process recipe by a system controller of a process system, wherein the system controller is connected to an MFC controller;
- identifying, by the system controller, a plurality of operating states of the MFC, each operating state being associated with a flow rate of a specific fluid;
- operating a dual-mode PID control loop in an active mode by the MFC controller while the MFC is in a training mode;
- conducting a test procedure by the MFC controller or a learning engine to determine a setpoint of a solenoid coil current for each of the plurality of operating states;
- storing the setpoints of the solenoid coil current in a storage unit coupled to the MFC controller;
- operating the dual-mode PID control loop in an inactive mode while the MFC is in an inference mode;
- retrieving stored setpoint from the storage unit by the MFC controller for a selected operating state; and
- generating a current based on the retrieved setpoint by a valve driver to bring a plunger of a solenoid valve to a position for delivering a required flow rate stipulated by the process recipe.

12. The method of claim 11, further including the step of measuring flow rates by the flow sensor for selected operating states while the dual-mode PID control loop is in the inactive mode.

13. The method of claim 12, further including the step of storing the measured flow rates in the storage unit.

14. The method of claim 13, further including a step of establishing a trend chart of measured flow rates for selected operating states by either the system controller or the MFC controller.

15. The method of claim 14, further including a step of applying SPC rules to the trend chart.

16. A method of delivering a fluid to a process system by an MFC, comprising:
- measuring a flow rate in one of a plurality of operating states of the MFC by a flow sensor while operating a dual-mode PID control loop in an inactive mode;
- storing measurement results in a storage unit by an MFC controller;
- establishing a trend chart of the flow rate for the operating state by the MFC controller or a system controller;
- applying SPC rules to the trend chart to determine whether retraining is required; and
- in response to an out-of-control condition indicated by the SPC rules, running a test procedure while the dual-mode PID control loop is in an active mode to determine a revised solenoid coil current associated with the operating state.

17. The method of claim 16, wherein the MFC further includes a fluid-conducting channel with an inlet and an outlet.

18. The method of claim 17, wherein the flow sensor is coupled to a separated channel receiving a portion of the fluid from the fluid-conducting channel by a proportional valve.

* * * * *